(12) United States Patent
Bancheri et al.

(10) Patent No.: US 7,845,390 B2
(45) Date of Patent: Dec. 7, 2010

(54) HAFNIA-MODIFIED RARE-EARTH METAL-BASED CERAMIC BODIES AND CASTING PROCESSES PERFORMED THEREWITH

(75) Inventors: Stephen Francis Bancheri, Albany, NY (US); Frederic Joseph Klug, Schenectady, NY (US); Bernard Patrick Bewlay, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 500 days.

(21) Appl. No.: 12/023,314

(22) Filed: Jan. 31, 2008

(65) Prior Publication Data

US 2009/0197758 A1 Aug. 6, 2009

(51) Int. Cl.
*B22C 1/00* (2006.01)
*B22C 9/10* (2006.01)
(52) U.S. Cl. .................................... 164/519; 164/369
(58) Field of Classification Search ................ 164/519, 164/529, 369
See application file for complete search history.

(56) References Cited

U.S. PATENT DOCUMENTS

| 6,152,211 | A | 11/2000 | Klug et al. |
| 6,345,663 | B1 | 2/2002 | Klug et al. |
| 6,676,381 | B2 | 1/2004 | Subramanian et al. |
| 7,296,616 | B2 | 11/2007 | Bewlay et al. |
| 2001/0033950 | A1* | 10/2001 | Billings ...................... 428/698 |
| 2007/0181278 | A1 | 8/2007 | Bancheri et al. |

* cited by examiner

*Primary Examiner*—Kuang Lin
(74) *Attorney, Agent, or Firm*—Penny A. Clarke (57) ABSTRACT

Compositions suitable for use as cores and shell molds for casting of reactive metal alloys, and casting processes for producing components from such alloys. The composition contains a sintered particulate material of hafnia and at least one additional metal oxide in amounts to yield a ceramic composition containing up to 70 molar percent of hafnia, wherein the additional metal oxide is a rare-earth oxide, the sintered particulate material contains first and second phases, the first phase is the rare-earth oxide and hafnia in solid solution, the second phase is a compound of the rare-earth oxide and hafnia, and the second phase is less reactive with the reactive metal alloy than the first phase.

20 Claims, 5 Drawing Sheets

FIG.6

HAFNIA-MODIFIED RARE-EARTH METAL-BASED CERAMIC BODIES AND CASTING PROCESSES PERFORMED THEREWITH

BACKGROUND OF THE INVENTION

This invention generally relates to casting processes and materials. More particularly, the invention relates to core and mold materials and processes for casting reactive metal alloys, including reactive metal alloys containing one or more reinforcing intermetallic phases, such as a niobium-silicide alloy.

Higher operating temperatures for gas turbine engines are continuously sought in order to increase their efficiency. While nickel, cobalt and iron-base superalloys have found wide use for components within the hot sections of gas turbine engines, alternative materials have been proposed to achieve improved high-temperature properties. For example, silicon-based non-oxide ceramics, such as silicon carbide (SiC) as a matrix and/or as a reinforcing material, have been proposed as candidates for high temperature applications, such as combustor liners, vanes, shrouds, airfoils, and other hot section components of gas turbine engines. Another example is refractory metal intermetallic composite (RMIC) materials, including alloys based on niobium, titanium, hafnium and zirconium, a notable example of which is niobium-silicon (NbSi) alloys. These alloys may further contain other alloying constituents, including titanium, hafnium, aluminum, chromium, etc. Depending on the particular composition, RMIC materials typically melt within a range of about 1500° C. to about 2100° C., and as such can have much greater temperature capabilities than existing nickel, cobalt, and iron-based superalloys.

NbSi alloys have become of particular interest for replacing superalloys in the hot sections of turbine engines because they are capable of possessing a promising combination of low-temperature mechanical properties, such as room temperature toughness, as well as high-temperature strength and creep resistance. The NbSi alloys usually have a microstructure containing a metallic Nb-base phase and one or more intermetallic phases including intermetallic niobium-silicide that form in-situ during solidification of the alloy. The niobium-base phase is relatively ductile, while the intermetallic niobium-silicide phase is brittle and stronger. As such, NbSi alloys may be referred to as a composite of a ductile metallic matrix phase and a brittle intermetallic strengthening phase.

As with superalloys, RMIC materials have been formed into gas turbine engine components by various casting techniques, a notable example being investment casting (lost wax) processes. Investment casting typically entails dipping a wax or plastic model or pattern of the desired component into a slurry comprising a binder and a refractory particulate material to form a slurry layer on the pattern. A common material for the binder is a silica-based material, for example, colloidal silica. A stucco coating of a refractory particulate material is typically applied to the surface of the slurry layer, after which the slurry/stucco coating is dried. The preceding steps may be repeated any number of times to form a shell mold of suitable thickness around the wax pattern. The wax pattern can then be eliminated from the shell mold, such as by heating, after which the mold is fired to sinter the refractory particulate material and achieve a suitable strength.

To produce hollow components, such as turbine blades and vanes having intricate air-cooling channels, one or more cores must be positioned within the shell mold to define the cooling channels and any other required internal features. Cores are typically made using a plasticized ceramic mixture that is injection molded or transfer molded in a die or mold, and then hardened by firing or baking. Typical ceramic compositions contain silica and/or alumina. One or more fired cores are then positioned within a pattern die cavity into which a wax, plastic or other suitably low-melting material is introduced to form the pattern. The pattern with its internal core(s) can then be used to form a shell mold as described above. Once the shell mold is completed and the pattern selectively removed to leave the shell mold and core(s), the shell mold can be filled with a molten metal, which is then allowed to solidify to form the desired component. The mold and core are then removed to leave the cast component with one or more internal passages where the core(s) formerly resided. Removal of silica-based and alumina-based cores is performed by a leaching process with a caustic solution (typically aqueous solutions of NaOH or KOH) in an autoclave at high pressures (e.g., about 100 to 500 psi; about 0.7 to 3.5 MPa) and temperatures (e.g., about 200° C.), with typically treatments requiring about ten to twenty hours, depending on the size of the core.

From the above, it can be appreciated that shell molds and cores used in investment casting processes must exhibit sufficient strength and integrity to ensure that the component will have the required dimensions, including wall thicknesses resulting from the location of each core relative to the shell mold. Additional challenges are encountered when attempting to form hollow castings of reactive materials, including NbSi alloys, as a result of their high melting temperatures and reactivity. Several approaches have been attempted to produce NbSi alloys, including casting, directional solidification, powder metallurgy, vapor deposition, and ingot metallurgy with thermomechanical processing. However, the high reactivity and complex chemistries of NbSi alloys have presented significant barriers to investment casting with conventional ceramic molds, as conventional silica and alumina cores have been found to react with NbSi alloys at the high casting temperatures.

Facecoats have been proposed to form a protective barrier between the molten NbSi alloy and the surfaces of the mold. For example, commonly-assigned U.S. Pat. No. 6,676,381 to Subramanian et al. describes a facecoat based on at least one rare-earth metal oxide and other inorganic components, including silicides, silicates, sulfides, and other oxides. Facecoats can also be used to protect surfaces of cores within a shell mold. However, improved materials for shell molds and cores are necessary in order to render investment casting processes viable for casting hollow near-net shaped articles of NbSi alloys.

BRIEF SUMMARY OF THE INVENTION

The present invention provides materials suitable for use as bodies, such as cores and shell molds, for use in casting reactive metal alloys, and casting processes that use such bodies to produce components from reactive metal alloys.

According to one aspect of the invention, a core is provided for use in combination with a shell mold to cast a hollow component from a molten reactive metal alloy. The core comprises a sintered particulate material containing hafnia ($HfO_2$) and at least one additional metal oxide in amounts to yield a ceramic composition containing up to 70 molar percent of hafnia, wherein the sintered particulate material contains first and second phases, the first phase is the rare-earth oxide and hafnia in solid solution, the second phase is a compound of the rare-earth oxide and hafnia, and the second phase is less reactive with the reactive metal alloy than the first phase. The additional metal oxide is yttria or a rare-earth metal oxide (hereinafter, the term "rare-earth oxide" will be used to refer to oxides of yttria and the rare-earth metals, though technically yttrium is not a rare-earth metal). The shell mold may also be formed to comprise a sintered particulate material containing hafnia and one or more rare-earth oxides, preferably in amounts of up to 70 molar percent of hafnia.

According to another aspect of the invention, a process is provided for casting a hollow component of a reactive metal alloy. The process makes use of a shell mold with a cavity containing a core. The core comprises a sintered particulate material comprising at least one additional metal oxide and hafnia in amounts to yield a ceramic composition containing up to 70 molar percent of hafnia, wherein the additional metal oxide is a rare-earth oxide, the sintered particulate material contains first and second phases, the first phase is the rare-earth oxide and hafnia in solid solution, the second phase is a compound of the rare-earth oxide and hafnia, and the second phase is less reactive with the reactive metal alloy than the first phase. A molten quantity of the reactive metal alloy is introduced into the cavity of the shell mold, and then allowed to cool and solidify to form the component. The shell mold and the core are then removed from the component.

According to a preferred aspect of the invention, the reactive metal alloy is chosen from the group consisting of niobium, titanium, hafnium, and zirconium-based alloys containing a strengthening intermetallic phase, and the core is substantially nonreactive with the molten reactive metal alloy. According to a particularly preferred aspect of the invention, the reactive metal alloy is a niobium-silicon alloy that contains a strengthening niobium-silicide phase.

A significant advantage of this invention is that the presence of the second phase in the core reduces reactions between the core and reactive metal alloys, including niobium, titanium, hafnium, and zirconium-based alloys that contain a strengthening intermetallic phase. Other desirable characteristics of cores produced from the ceramic composition of this invention include good strength, relatively low density (porosity), manufacturability, and a coefficient of thermal expansion (CTE) relatively close to that of niobium, titanium, hafnium, and zirconium-based alloys. The amount of hafnia in the ceramic composition of the core is maintained at or below 70 molar percent to ensure that the core can be leached from the component following the casting operation. Low density resulting from porosity is desirable as it provides surface-connected porosity to enable a leachant to infiltrate the core, thereby further promoting the leachability of the core. The shell mold may also be formed of the same or similar material as the core.

Other objects and advantages of this invention will be better appreciated from the following detailed description.

DETAILED DESCRIPTION OF THE INVENTION

Figure 1:
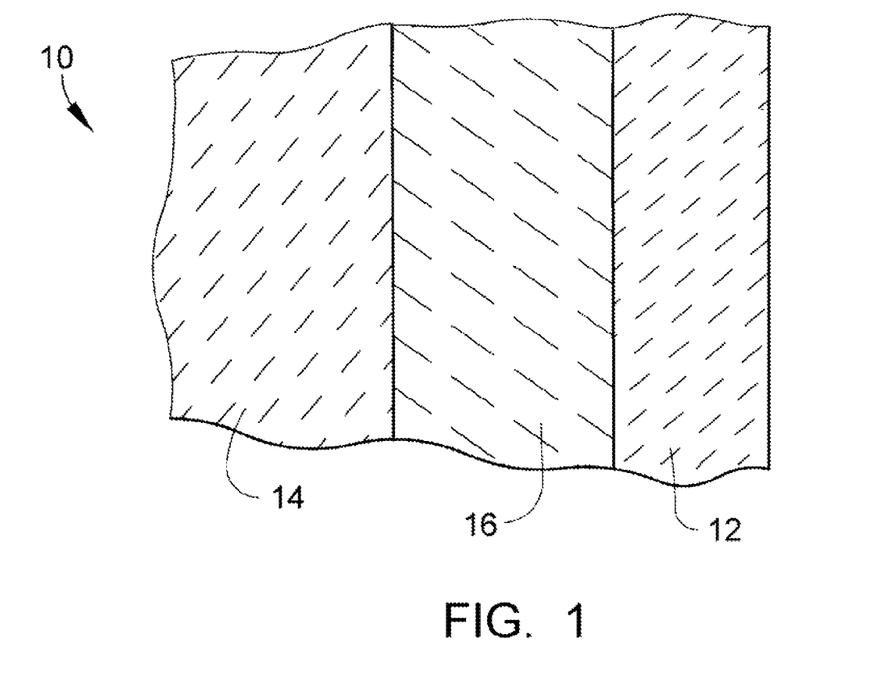
FIG. 1 represents a fragmentary cross-sectional view of a mold assembly including a shell mold containing a core with a wax pattern therebetween in accordance with an embodiment of the invention.

FIG. 1 represents a fragment of a wall section of a mold assembly 10 for investment casting a hollow component. According to a preferred aspect of the invention, the mold assembly 10 is adapted for casting reactive metals, such as niobium, titanium, hafnium, and zirconium-based alloys, though it is foreseeable that the invention could be employed with other alloy systems. Of particular interest are reactive metal alloys reinforced with an intermetallic phase, specific examples of which include NbSi alloys having a microstructure containing a niobium-silicide strengthening phase within a metallic Nb-base matrix phase, and optionally other intermetallic silicide phases. Examples of notable NbSi alloys are disclosed in U.S. Pat. No. 5,833,773 to Bewlay et al., U.S. Pat. No. 5,932,033 to Jackson et al., U.S. Pat. No. 6,419,765 to Jackson et al., U.S. Pat. No. 6,676,381 to Subramanian et al., U.S. Pat. No. 6,913,655 to Jackson et al., and U.S. Pat. No. 7,296,616 to Bewlay et al., and U.S. Published Patent Application Nos. 2006/0042725 to Bewlay et al. and 2007/0181278 to Bancheri et al. The contents of these patent documents relating to NbSi alloys, including their compositions and processing, are incorporated herein by reference.

NbSi alloys suitable for casting with the mold assembly 10 of this invention may contain one or more of titanium, hafnium, chromium, and aluminum. For example, typical and preferred ranges for titanium are, in atomic percent, about 2% to about 30% and about 12% to about 25%, respectively, typical and preferred ranges for hafnium are, in atomic percent, about 0.5% to about 12% and about 2% to about 8%, respectively, typical and preferred ranges for chromium are, in atomic percent, about 0.1% to about 20% and about 2% to about 12%, respectively, and typical and preferred ranges for aluminum are, in atomic percent, about 0.1% to about 15% and about 0.1% to about 4%, respectively. NbSi alloys of interest may also contain additional elements, nonlimiting examples of which are molybdenum, yttrium, tantalum, zirconium, iron, tungsten, and tin. The inclusion and amounts used of any of these elements will depend on a variety of factors, such as the desired properties for the final alloy product, and generally all such compositions are within the scope of the invention.

The amount and composition of the silicide phase within the reactive metal alloy can vary significantly, as described in U.S. Published Patent Application No. 2006/0042725 to Bewlay et al. The silicide phase may be an $M_3Si$ silicide or an $M_5Si_3$, where M is Nb, Ti, and/or Hf, depending on the particular composition of the alloy. The microstructure of the alloy may contain other phases as well.

The mold assembly 10 is presented in FIG. 1 as including a shell mold 12 as the outermost member of the assembly 10, and a core 14 within a cavity defined by the shell mold 12. Situated between the shell mold 12 and core 14 is a model or pattern 16 formed of a wax, plastic or other suitable material having a suitably low melting temperature. While a portion of a single core 14 is visible in FIG. 1, multiple cores could be used. Conventional techniques can be employed to incorporate the core 14 into the mold 12. For example, the core 14 can be placed in a die, followed by the injection of wax around the core 14, after which the shell mold 12 can be built up around the resulting wax-core assembly by dipping, molding, etc. Alternatively, the core 14 could be placed within the shell mold 12 after the mold 12 has been fully completed. Various other processing options are possible and within the scope of this invention.

Figure 2:
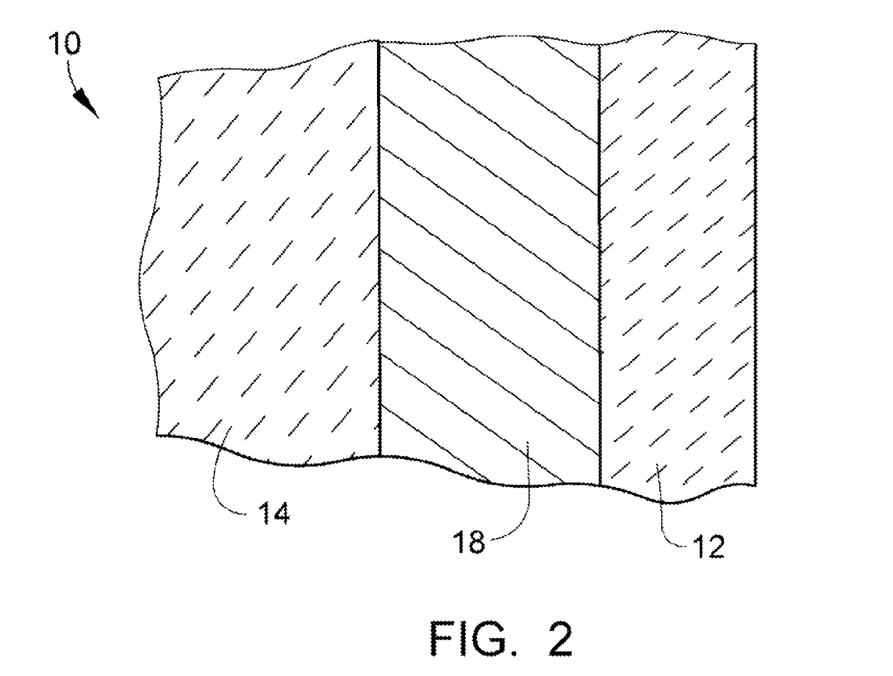
FIG. 2 represents a fragmentary cross-sectional view of a niobium-silicon alloy that has been investment cast within the mold assembly of FIG. 1 in accordance with an embodiment of the invention.

As known in the art of investment casting, the pattern 16 corresponds to the shape of the component to be cast from the reactive metal alloy, and is removed from the shell mold 12 prior to introducing a melt of the reactive metal alloy into the mold 12. A variety of techniques can be used to remove the pattern 16, including such conventional techniques as flash-dewaxing, microwave heating, autoclaving, and heating in a conventional oven. FIG. 2 schematically represents the mold assembly 10 following removal of the pattern 16, and following the introduction and solidification of a reactive metal alloy within the shell mold cavity to form a hollow component 18, for example, an air-cooled airfoil component such as a turbine blade or vane. Aside from the materials from which they are formed as discussed below, the shell mold 12 and core 14 can be used in substantially conventional investment casting processes, as well as other types of casting processes, and as such the casting process itself will not be discussed in any great detail.

The core 14 is a ceramic composition that contains hafnia ($HfO_2$) and oxides of one or more rare-earth metals, such as yttrium, lanthanum, cerium, praseodymium, neodymium, promethium, samarium, europium, gadolinium, terbium, dysprosium, holmium, erbium, thulium, ytterbium and/or lutetium, with yttria ($Y_2O_3$) being the preferred rare-earth oxide (as previously noted, though yttrium is not technically a rare-earth metal, yttria is referred to herein as a rare-earth oxide as a matter of convenience). Hafnia and the one or more rare-earth oxides are present in a ratio that yields a first phase in which the rare-earth oxide(s) and hafnia are in solid solution and a second phase of a rare-earth hafnate compound that is less reactive with the reactive metal alloy than the first phase. More preferably, the ceramic composition is predominantly or entirely the first and second phases, and the second phase is a cubic fluorite-type hafnate phase $RO-2HfO_2$, where RO stands for the rare-earth oxide. In the example in which yttria is the rare-earth oxide, the second phase is the yttrium hafnate compound $Y_2O_3-2HfO_2$ ($Y_2Hf_2O_7$). However, as discussed below, hafnia-rich compositions are believed to be undesirable as being relatively difficult to remove from the component 18 by leaching, as discussed below. For this reason, ceramic compositions may contain hafnia in amounts of up to 70 molar percent, more preferably up to 50 molar percent, and most preferably in a range of at least 1 to about 30 molar percent. The shell mold 12 (with or without a face-coat) may also be formed of the same family of ceramic compositions used to form the core 14. As such, references to the composition of the core 14 in the following discussion are also applicable to the composition of the shell mold 12.

As is generally conventional in the fabrication of cores for casting processes, the ceramic composition of the core 14 is formed from a mixture of ceramic powders. The powders are preferably formed entirely of particles having the desired ceramic composition and particle size distribution (discussed below) for the core 14, though it is foreseeable that mixtures of different powders could be used. It is also foreseeable that hafnium metal and/or one or more hafnium compounds could be present in the powder mixture, which during processing (firing) of the core are converted to hafnia. In addition to low reactivity with reactive metal alloys such as niobium, titanium, hafnium, and zirconium-based alloys, the hafnia-rare-earth oxide compositions of the core 14 are also advantageous in terms of having a coefficient of thermal expansion (CTE) near that of these reactive metal alloys.

Yttria is highly refractory with respect to most NbSi alloy compositions. However, NbSi alloys and other reactive metal alloys containing hafnium may exhibit some level of reactivity with cores and molds formed entirely of yttria. The addition of hafnia to an yttria-based (or other rare-earth oxide-based) ceramic composition results in the formation of the yttrium hafnate phase, which reduces and minimizes the reactivity of the core 14 with NbSi alloys during the casting process, during which the molten alloy is typically at a temperature in a range of about 1500° C. to about 2100° C. As such, hafnia in the core 14 reduces the thermodynamic activity difference between a NbSi alloy and the core material. Ceramic compositions containing yttria and/or yttrium hafnate may further contain other rare-earth oxides, for example, to reduce the temperature, time, etc., to sinter the powder and form the core 14, and/or to provide a better CTE match with the alloy being cast. As understood in the art, a good CTE match is desirable to reduce shrinkage during firing and de-binding of the core 14, since a linear shrinkage of greater than about one percent can lead to distortion or poor dimensional control during firing with the result being a core 14 with a distorted shape or dimensions out of tolerance.

Figure 6:
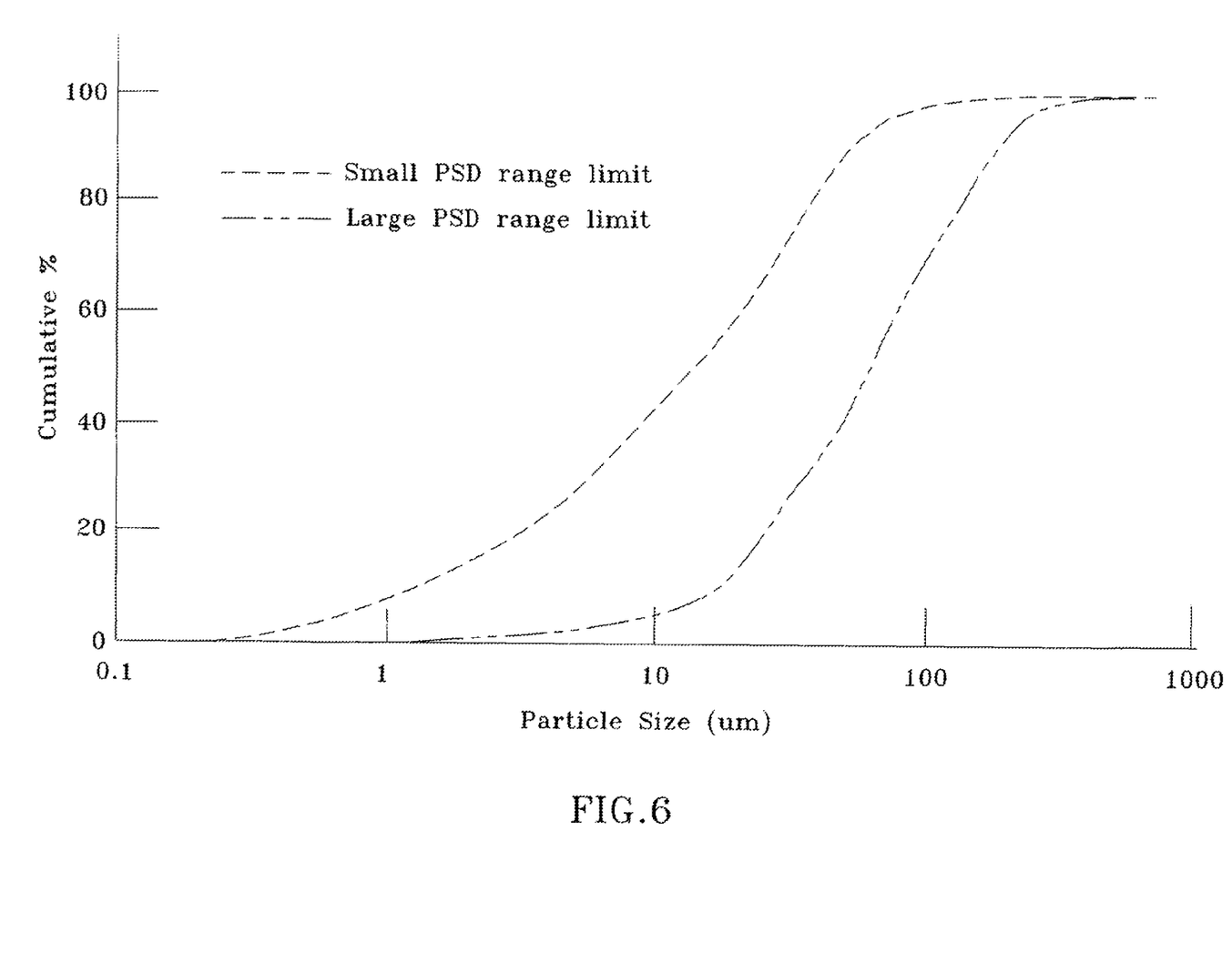
FIG. 6 is a graph plotting range limits of a particle size distribution for yttria-hafnia powders used to produce cores within the scope of this invention.

In addition to composition, other aspects of the powder are believed to be important or at least preferred in order to optimize the properties of the core 14. The particle size for the powder preferably does not exceed about 1 millimeter, with a preferred powder having a particle size distribution (PSD) with range limits shown in FIG. 6. As represented in FIG. 6, preferred powders contain particles in a size range of about 0.1 to about 600 micrometers, with up to about 10% of the particles being smaller than about 1 micrometer and about 90% being about 200 micrometers or smaller. A preferred size range is believed to be about 5 to about 100 micrometers, more preferably about 10 to about 70 micrometers.

During the fabrication of the core 14, the powder is combined with a binder system, such as a wax, polyvinyl acetate (PVA), or a like polymer, to form a slurry. As known in the art, additional additives, such as defoaming agents, pH adjusters, etc., can also be incorporated into the slurry. The slurry can be prepared by standard techniques using conventional mixing equipment, and then undergoes processing to form the core 14, such as by pressing, injection molding, transfer molding, or another suitable technique. The core 14 is then dried and fired in accordance with well-known practices. Preferred binders should provide adequate green strength to the core 14 after drying, and burn off cleanly prior to or during firing.

Suitable drying temperatures are believed to be from room temperature up to about 180° C. in air, and suitable firing temperatures are believed to be in a range of about 1500° C. to about 1800° C., though higher and lower temperatures are also foreseeable. Prior to firing to the final sintering temperature, the core 14 may undergo a pre-sintering process that involves heating the core 14 to an intermediate temperature less than the final sintering temperature to eliminate any organic additives within the core (e.g., binders, agents, etc.) without cracking the core. Firing can be performed according to conventional techniques in, for example, a gas or electric furnace. As understood in the art, suitable and preferred temperatures, durations, and heating rates during drying and firing will depend on factors such as wall thickness, composition, particle size, etc. As such, the drying and firing temperatures and durations can vary significantly.

During firing, the powder particles are sintered to form a monolithic, porous structure preferably of low density, for example, about 50 to about 70% of theoretical. As a result of the sintering process, it is foreseeable that the core 14 may contain reaction products in addition to rare-earth hafnate compound(s). Porosity is preferably though not necessarily connected to the surface of the core 14 for the purpose of promoting leaching of the core 14 from the component 18 after the casting operation. In addition to porosity, leachability, and the previously noted CTE match with the reactive metal alloy, the core 14 also preferably exhibits a desirable minimum level of strength, preferably greater than about 1500 psi (about 10 MPa) tensile strength.

After the wax pattern 16 and shell mold 12 are formed around the core 14 and the pattern 16 is subsequently removed as described above, molten niobium-silicon alloy or other molten reactive metal is poured into the shell mold 12 to fill the cavity created by removal of the pattern 16. The molten alloy is preferably introduced into the cavity while the mold 12 and core 14 are at an elevated temperature, as conventionally performed when investment casting such alloys. A nonlimiting example of a casting technique that can be employed is disclosed in U.S. Pat. No. 6,676,381 to Subramanian et al. As the molten niobium-silicon alloy is poured into the mold 12 and contacts the core 14, the hafnia-containing ceramic composition of the core 14, and particularly the hafnate phase, inhibits any substantial reaction between the molten alloy and the core 14, thereby reducing the likelihood of defects in the casting. The reduced reactivity of the yttrium hafnate compound $Y_2Hf_2O_7$ has been shown in reaction tests performed by immersing yttria-based cores in molten NbSi alloy.

Figure 3:
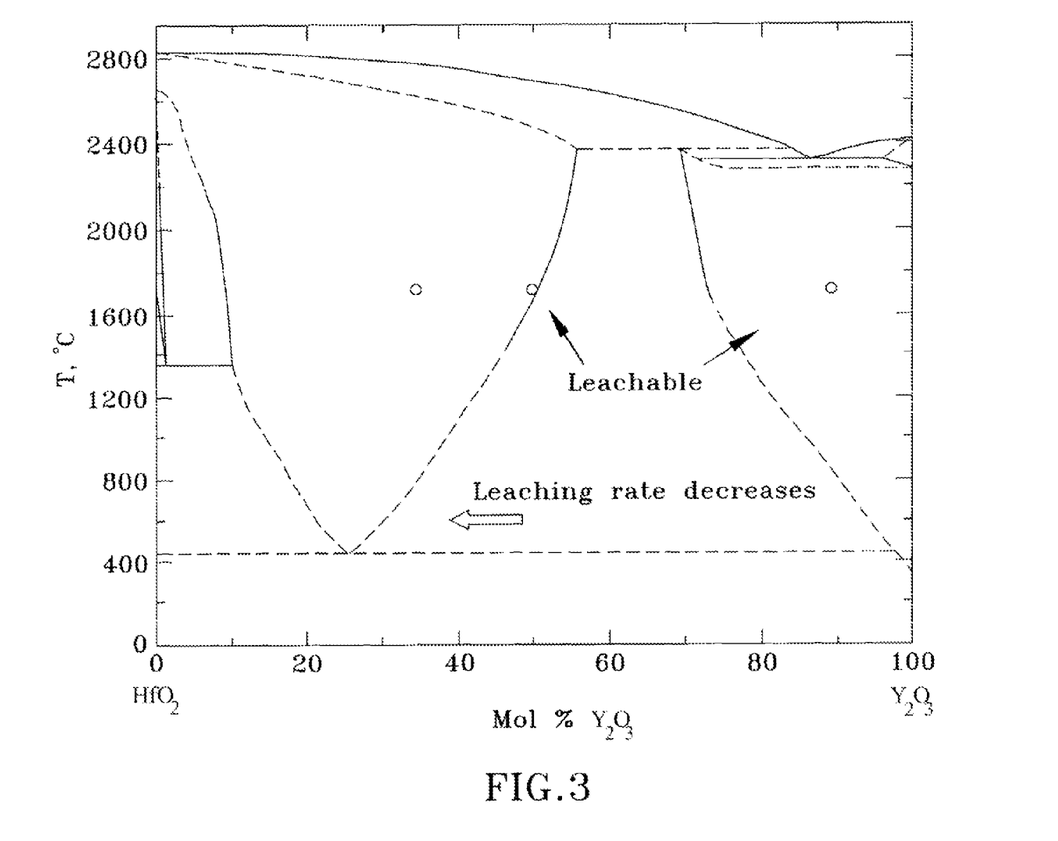
FIG. 3 is a hafnia-yttria phase diagram that identifies hafnia-yttria compositions preferred for use as core materials of this invention.
Figure 4:
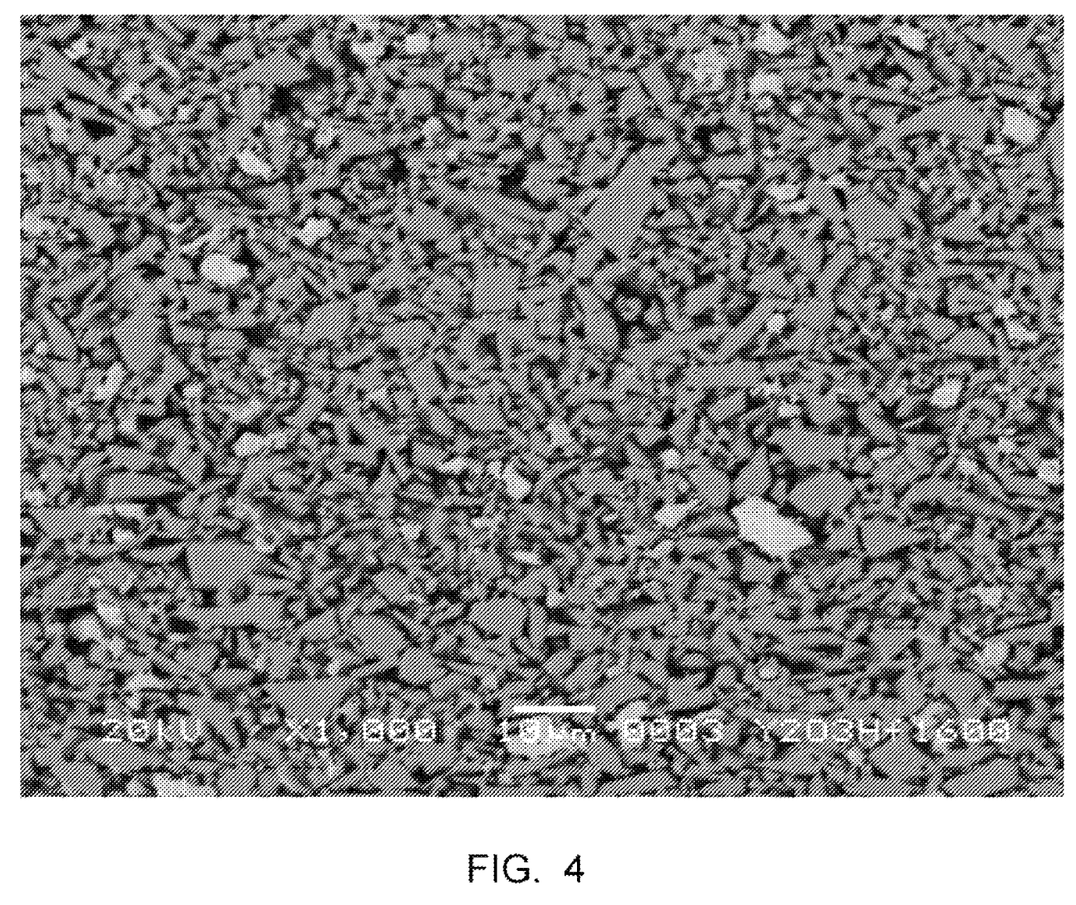
FIGS. 4 and 5 are scanned images of cores produced from two different yttria-hafnia compositions within the scope of this invention.
Figure 5:
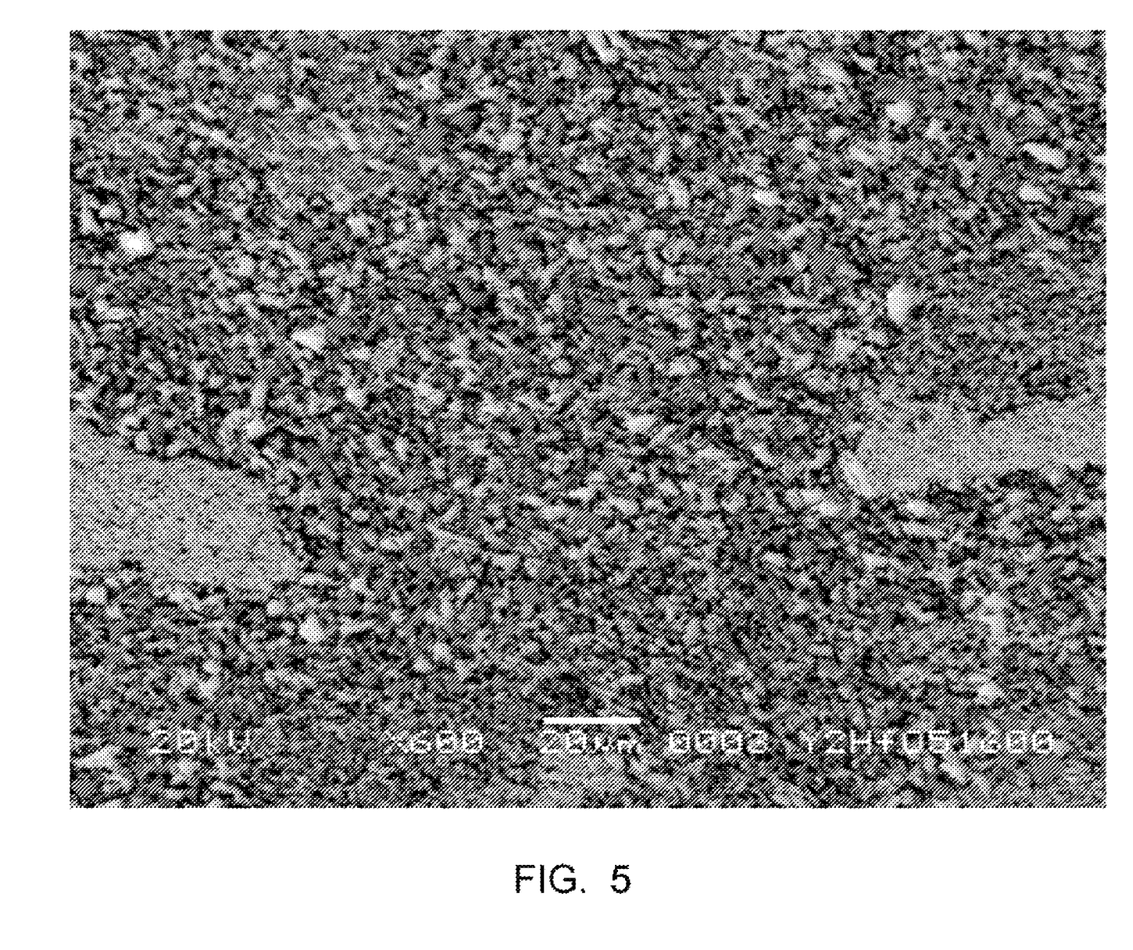

FIG. 3 identifies three yttria-hafnia compositions that were prepared and formed into free-standing pellets (about 2.5 cm diameter× about 0.6 cm thick), that were evaluated for leachability. Labeled as compositions #1 through #3 from left to right in the binary phase diagram of FIG. 3, the compositions were yttria-hafnia mixtures of, respectively about 67 molar percent hafnia, about 50 molar percent hafnia, and about 12 molar percent hafnia, the balance yttria. Each core was produced with a powder generally as described above in reference to FIG. 6, and was sintered at about 1700° C. The leaching process was performed at about 110° C. in a sealed system using a 69% nitric acid as the leaching solution, rather than in an autoclave with a caustic solution as done with silica and alumina cores. At room temperature and at the 1700° C. sintering temperature, all three compositions contain the cubic fluorite-type hafnate ($Y_2Hf_2O_7$) phase and a solid solution of hafnia and cubic yttria phase. At room temperature, compositions #1 and #2 were predominantly the cubic $Y_2Hf_2O_7$ phase and composition #3 was predominantly the hafnia-yttria solid solution phase. SEM microphotographs of the pellets formed of compositions #3 and #2 are shown in FIGS. 4 and 5, respectively. As noted in FIG. 3, leaching rate (leachability) was found to decrease with increasing hafnia content. Under the above-noted leaching conditions, the #2 composition (50% hafnia) was moderately leachable and the #3 composition (12% hafnia) was very leachable (fully leached in ninety minutes), whereas the #1 composition (67% hafnia) was only slightly leachable.

From the above, it was concluded that the hafnia content and phase content of yttria-hafnia compositions (and presumably other compositions containing hafnia and a rare-earth oxide) influence leachability. In particular, compositions containing less than 50 molar percent hafnia and particularly those containing the yttria-hafnia solid solution are well-suited for use as the ceramic composition for the core 14, whereas compositions containing up to about 70 molar percent hafnia and predominantly of the hafnate phase are less well suited because of reduced leachability, and compositions containing more than about 70 molar percent hafnia are likely unsuitable because of poor leachability. Based on the leachability observed with the test pellets, it is believed that a particularly suitable hafnia content is at least 1 to about 30 molar percent. Though appearing to negatively affect leachability, the presence of the $Y_2Hf_2O_7$ phase is important in the ceramic compositions of this invention because of its lower reactivity with the reactive NbSi alloy system.

While the invention has been described in terms of certain embodiments, it is apparent that other forms could be adopted by one skilled in the art. Therefore, the scope of the invention is to be limited only by the following claims.

The invention claimed is:

1. A core for use in combination with a shell mold to cast a component from a molten reactive metal alloy, the core comprising a sintered particulate material comprising at least one rare-earth oxide and hafnia in amounts to yield a ceramic composition containing up to 70 molar percent of hafnia, wherein the sintered particulate material contains first and second phases, the first phase is the rare-earth oxide and hafnia in solid solution, the second phase is a compound of the rare-earth oxide and hafnia, and the second phase is less reactive with the reactive metal alloy than the first phase.

2. The core according to claim 1, wherein the second phase is a cubic rare-earth hafnate compound having a formula $RO-2HfO_2$, wherein RO is the rare-earth oxide.

3. The core according to claim 1, wherein the ceramic composition is predominantly the first and second phases, and the second phase is a cubic rare-earth hafnate compound having a formula $RO-2HfO_2$, wherein RO is the rare-earth oxide.

4. The core according to claim 1, wherein the ceramic composition is predominantly the first phase, and the second phase is a cubic rare-earth hafnate compound having a formula $RO-2HfO_2$, wherein RO is the rare-earth oxide.

5. The core according to claim 1, wherein the at least one rare-earth oxide is yttria.

6. The core according to claim 1, wherein the ceramic composition consists essentially of the first and second phases, the first phase is a solid solution of hafnia and cubic yttria, and the second phase is $Y_2Hf_2O_7$.

7. The core according to claim 1, wherein the core is within a cavity of a shell mold adapted to contain the molten reactive metal alloy.

8. The core according to claim 7, wherein the shell mold comprises a sintered particulate material comprising at least one rare-earth oxide and hafnia in amounts to yield a ceramic composition containing up to 70 molar percent of hafnia.

9. The core according to claim 1, wherein the reactive metal alloy is chosen from the group consisting of niobium-based, titanium-based, hafnium-based, and zirconium-based alloys containing a strengthening intermetallic phase, and the core is substantially nonreactive with the molten reactive metal alloy.

10. A process of casting a component of a reactive metal alloy, the process comprising:
  providing a shell mold with a cavity containing a core, the core comprising a sintered particulate material comprising at least one rare-earth oxide and hafnia in amounts to yield a ceramic composition containing up to 70 molar percent of hafnia, wherein the sintered particulate material contains first and second phases, the first phase is the rare-earth oxide and hafnia in solid solution, the second phase is a compound of the rare-earth oxide and hafnia, and the second phase is less reactive with the reactive metal alloy than the first phase;
  introducing a molten quantity of the reactive metal alloy into the cavity of the shell mold;

allowing the molten quantity to cool and solidify to form the component; and then removing the shell mold and the core from the component.

11. The process according to claim 10, wherein the second phase is a cubic rare-earth hafnate compound having a formula $RO-2HfO_2$, wherein RO is the rare-earth oxide.

12. The process according to claim 10, wherein the ceramic composition is predominantly the first and second phases, and the second phase is a cubic rare-earth hafnate compound having a formula $RO-2HfO_2$, wherein RO is the rare-earth oxide.

13. The process according to claim 10, wherein the ceramic composition is predominantly the first phase, and the second phase is a cubic rare-earth hafnate compound having a formula $RO-2HfO_2$, wherein RO is the rare-earth oxide.

14. The process according to claim 10, wherein the at least one rare-earth oxide is yttria.

15. The process according to claim 10, wherein the ceramic composition consists essentially of the first and second phases, the first phase is a solid solution of hafnia and cubic yttria, and the second phase is $Y_2Hf_2O_7$.

16. The process according to claim 10, wherein the shell mold comprises a sintered particulate material comprising at least one rare-earth oxide and hafnia in amounts to yield a ceramic composition containing up to 70 molar percent of hafnia.

17. The process according to claim 10, wherein the particulate material predominantly has a particle size of about 5 to about 100 micrometers prior to being sintered to form the core.

18. The process according to claim 10, wherein the reactive metal alloy is chosen from the group consisting of niobium-based, titanium-based, hafnium-based, and zirconium-based alloys containing a strengthening intermetallic phase, and the core is substantially nonreactive with the molten reactive metal alloy.

19. The process according to claim 18, wherein the reactive metal alloy is a niobium-silicon alloy and contains a strengthening niobium-silicide phase.

20. The process according to claim 10, wherein the component is a hollow air-cooled airfoil component of a gas turbine engine.

* * * * *